US006349266B1

(12) United States Patent
Lysaght et al.

(10) Patent No.: US 6,349,266 B1
(45) Date of Patent: Feb. 19, 2002

(54) REMOTE CONTROL QUALIFIER

(75) Inventors: Richard G. Lysaght, Hicksville; Tony L. Casterline, Middle Point, both of OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

(21) Appl. No.: 09/322,366

(22) Filed: May 28, 1999

(51) Int. Cl.[7] ................................................ G01L 3/00
(52) U.S. Cl. ...................................... 702/41; 73/379.01
(58) Field of Search ........................... 702/41, 33, 105, 702/113, 180, 114, 115; 73/379.01; 714/714, 715, 712, 713, 798, 819; 173/177, 178, 180, 181, 5

(56) References Cited

U.S. PATENT DOCUMENTS

| | | | | |
|---|---|---|---|---|
| 4,517,821 A | * | 5/1985 | Taggart et al. | 73/1.01 |
| 5,586,050 A | | 12/1996 | Makel et al. | |
| 5,686,903 A | | 11/1997 | Duckworth et al. | |
| 5,689,261 A | | 11/1997 | Mehta et al. | |
| 5,841,118 A | | 11/1998 | Fast et al. | |
| 5,903,462 A | * | 5/1999 | Wagner et al. | 700/108 |
| 5,907,491 A | * | 5/1999 | Canada et al. | 700/108 |
| 6,167,606 B1 | * | 1/2001 | Mueller et al. | 29/407.02 |

* cited by examiner

*Primary Examiner*—Marc S. Hoff
*Assistant Examiner*—Edward Raymond
(74) *Attorney, Agent, or Firm*—Emch, Schaffer, Schaub & Procello Co., L.P.A.

(57) ABSTRACT

This remote control qualifier, typically a radio frequency (RF) qualifier, is an apparatus for monitoring a mechanical torque wrench with torque switch. The torque wrench includes a means for stimulating the torque switch wherein the torque switch can provide an electrical signal upon reaching target torque. The torque wrench also includes a transmitter for sending the electrical signals to a receiver. The RF qualifier is remote and includes a receiver for receiving the electrical signals from the transmitter of the torque wrench. The remote qualifier also includes a means for electrically computationally processing the electrical signals into other signals.

24 Claims, 7 Drawing Sheets

REMOTE CONTROL QUALIFIER

TECHNICAL FIELD

This invention relates to a remote control tool monitor and assembly qualifier that verifies that the correct number of fasteners have been properly installed into an assembly. When used in conjunction with a mechanical click wrench, proper fastener torque and count can be verified.

BACKGROUND ART

Industry long has used compressed-air screw or bolt tighteners having a driving motor which drives a driving shaft for a screwing or tightening tool. The motor is operated by compressed air and a control valve for switching the compressed-air supply on or off. A pressure-regulating valve is used to regulate the screw or bolt tightener. Compressed air, fluids such as oil, electric current and mechanical pressure may drive the tool. Programmable controllers and computers also are known to be a part of the closed loop for monitoring and controlling the driving force of the tool.

U.S. patent application Ser. No. 08/936,187 (Lysaght), assigned to the instant assignee and herein incorporated by reference discloses an assembly qualifier that is a counting apparatus that monitors either the pressure of an air tool, the current of an electrical tool or the torque of a mechanical wrench to determine if the tool has shutoff at a target torque. The qualifier also determines if some unknown means shuts off the tool.

DISCLOSURE OF THE INVENTION

The remote control qualifier of this invention is an apparatus for monitoring a mechanical torque wrench with torque switch. The torque wrench includes a means for electrically stimulating the torque switch wherein the torque switch can provide an electrical signal upon reaching target torque. The torque wrench also includes a transmitter for sending the electrical signals to a receiver. A remote qualifier includes a receiver for receiving the electrical signals from the transmitter of the torque wrench. The remote qualifier also includes a means for electrically computationally processing the electrical signals into other signals representing at least one parameter corresponding to a condition of the tool being monitored which is a function of the condition, wherein the means for electrically processing the signals includes a programmed microprocessor configured to identify a portion of the signals representative of the switch condition corresponding to the parameter, and a means for displaying the parameter. Preferably, the qualifier is a radio frequency (RF) qualifier.

The RF qualifiers (tool transmitter and AQ receiver) operate in the 900 MHz range. Preferably, one of eight different frequencies can be selected so that multiple units can operate in close proximity. A rolling code algorithm is implemented in these devices to ensure that cross talk between units that are set to the same frequency is impossible. Before using a given tool with a qualifier, both units need to be set to the same frequency. The qualifier must also learn the "seed code" of the tool's transmitter.

An RF qualifier used with mechanical "click" (torque) wrenches will illustrate the apparatus. While many versions may exist, three other versions of the assembly qualifier are singled ported air tools, dual port air tools and electrical tools.

BEST MODE OF CARRYING OUT INVENTION

In one embodiment, the programmed microprocessor of the RF qualifier for monitoring a mechanical torque wrench is configured to identify and store a portion of the electrical signal as a calibration value. In a second embodiment, the programmed microprocessor is configured to identify and store the parameter of a threshold corresponding to the calibration value. In a third embodiment, the programmed microprocessor is configured to identify and store the parameter of a first period of time for the electrical signal to attain a predetermined level and also configured to identify and store a second period of time for the electrical signal to remain at that level.

In the preferred embodiment, the programmed microprocessor is configured to identify a portion of the signals representative of the electrical signal of the tool driving a fastener to its target torque and successfully completing a cycle. The programmed microprocessor also is configured to count a completed cycle, store the count and generate signals when the measured voltage is the same as the identified and stored parameter. The programmed micropressor further is configured to generate signals when a cycle is completed unsuccessfully. Finally, the programmed microprocessor is configured to generate signals when a fastener has been over torqued.

The following procedure is for selecting channels. If two or more qualifiers are going to work in close proximity with each other, separate channels should be selected for each tool and qualifier set. In order to accomplish this, the channel select dip switch inside the assembly qualifier and the six-pin jumper on the tool need to be changed.

Figure 1:
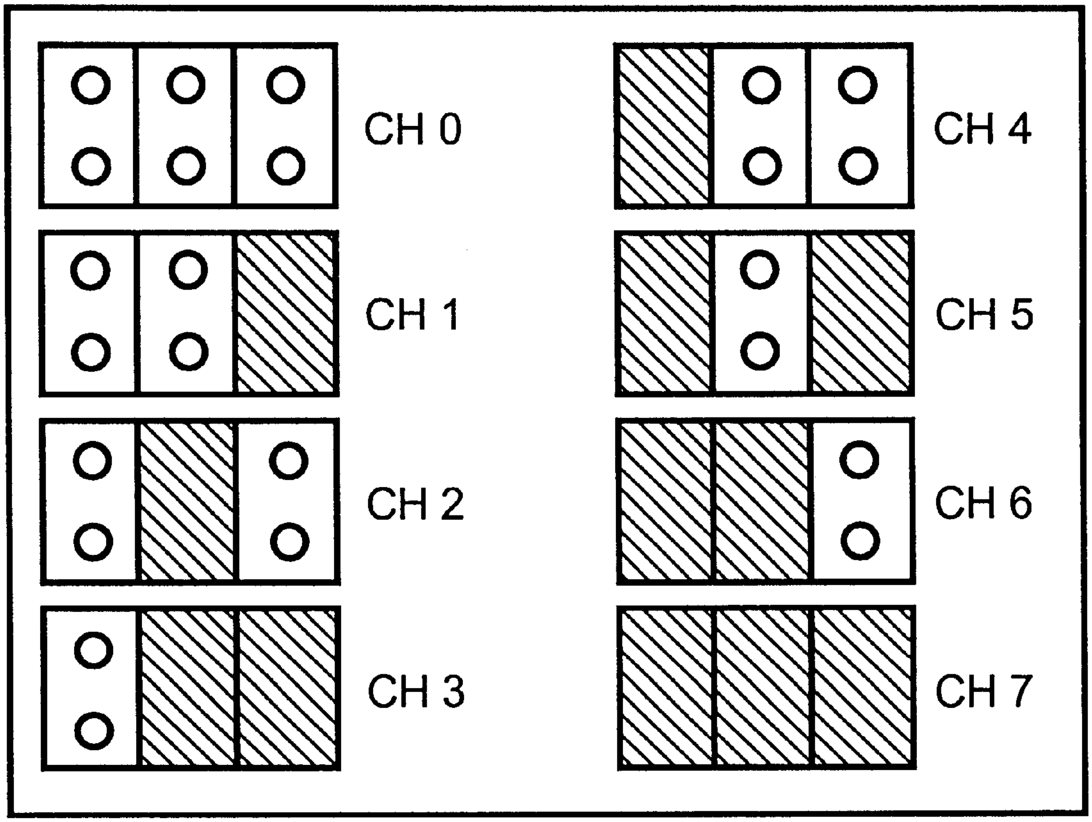
FIG. 1 is an illustration of an RF transmitter's channel selection pattern.

FIG. 1 illustrates the transmitter's channel selection pattern. With the battery at the bottom of the board, jumpers should be added in order to select the desired channel by matching the display of FIG. 1.

Figure 2:
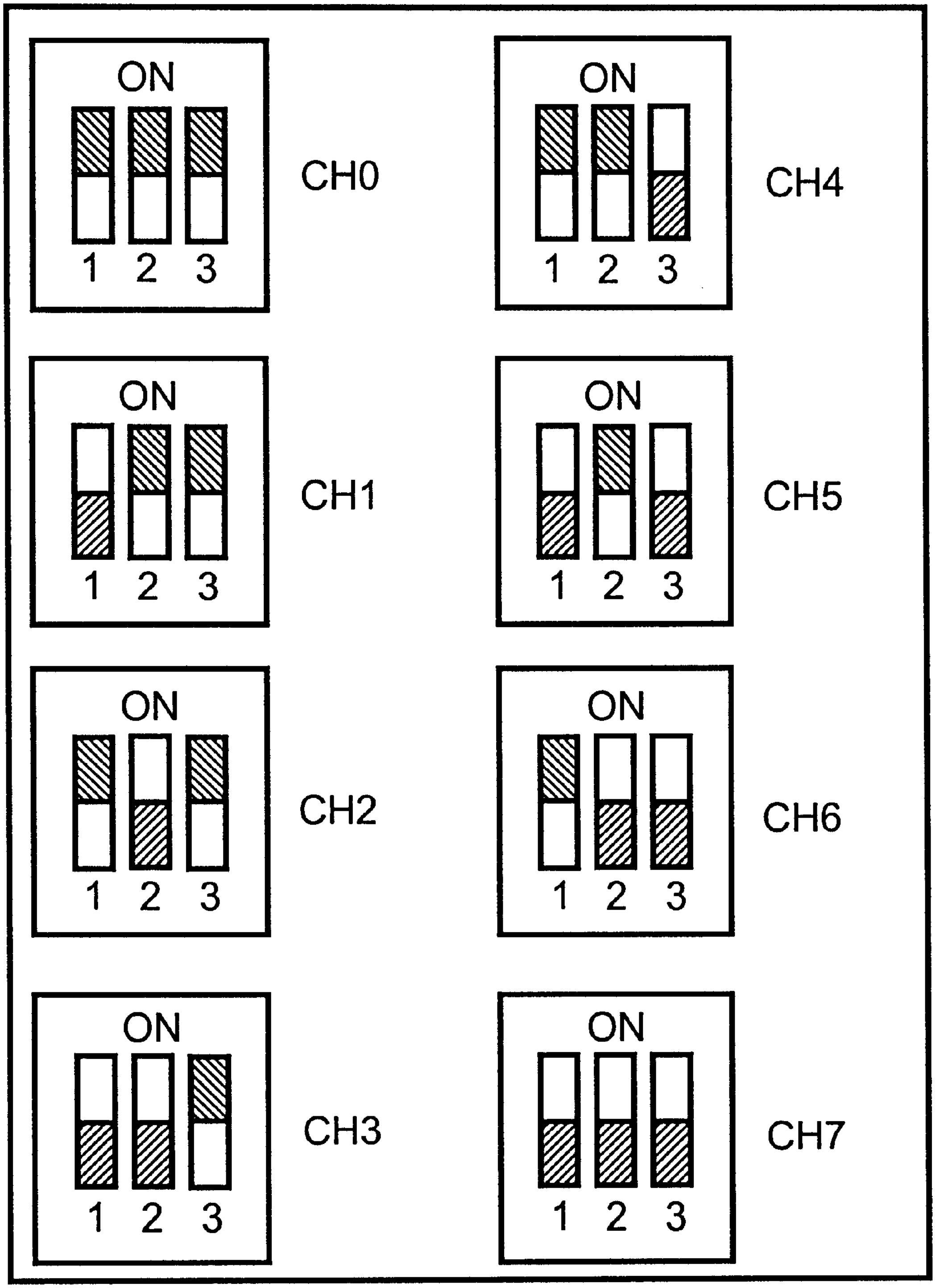
FIG. 2 is an illustration of an RF receiver dip-switch pattern located inside the qualifier.

The qualifier's channel is selected in a similar fashion. FIG. 2 shows the dip-switch pattern on the board located inside the qualifier set. These patterns establish the reception frequency. The following uses the illustration of FIGS. 1 and 2 as a guide.

In learning the algorithm, the qualifier must first learn the transmitter's seed code before it will accept it. In order to accomplish this, locate and press the "LEARN" button on the board inside the qualifier. Hold it down until the LED comes on and stays on. Activate the transmitter until the LED goes off. Activate the transmitter once more until the LED begins to flash. The LED should flash for four seconds. To clear all learned transmitters, press the "LEARN" button for approximately ten seconds until the LED turns off. The qualifier can learn up to four different transmitters.

Regarding batteries, the transmitters use a 12-volt alkaline battery type A23 (Energizer) or MN21 (Duracell). A battery will last for approximately 25,000 ¼ second cycles.

This assembly qualifier is a counting apparatus that monitors either the pressure of an air tool, the current of an electrical tool or the torque of a mechanical wrench to determine if the tool has shutoff at a target torque. The qualifier also determines if some unknown means shuts off the tool. While many versions may exist, I will discuss a version used with mechanical "click" (torque) wrenches to illustrate the invention.

Assembly Mode

When the unit first powers up, it enters assembly mode. If the unit is "locked", the assembly function is the only mode the user is allowed to access. When the unit is unlocked, the mode button allows the user to page through different features including the assembly mode.

When entering the assembly mode, ASSY is displayed while the mode button is depressed. When the mode button is released the user will see an A (signifying the parameter being used), and up or down arrow (informing the user which direction the unit is counting), and a two digit number. Units featuring the parameter selection switch will display an A, B, C, or D depending upon which parameter has been selected by the switch. See FIG. 9.

If the unit is counting upward, every successful cycle will increment the counter on the display by one. Once the preset number of screws in the assembly is reached, the count is reset to zero. If the unit is counting down, the preset will appear as the two-digit number. Every successful cycle will decrement the count by one. Once zero is reached the unit will reset the display to the preset. Every screw that is successfully completed lights the ACCEPT LED and fires the CYCLE ACCEPT relay.

Upon completion of an assembly cycle, a double beep will occur (this is dip-switch selectable) and the BATCH ACCEPT relay will fire.

The operation of the relays is dip-switch selectable. The relays may either be normally open or normally closed based on a dip switch setting. Relays may also be latching or momentary based upon a dip-switch setting.

If the tool overtorques a screw, REJECT LED is lit and the sonalert lets out one beep. When the REJECT LED comes on, the REJECT relay fires. The REJECT relay may also be made to be normally open or normally closed and may be latching or momentary in operation.

The user may press the SET button to clear the present count. Once the user presses the SET button, the display will begin to flash. If the button is held long enough (approximately three seconds) the count will be reset to zero if the unit is counting up or the preset if the unit is counting down.

Setpoint Mode

If the unit is unlocked, the MODE button will allow the user to access the setpoint mode. Upon entering the setpoint mode, the display will read STPA (if parameter A is in use) until the mode button is released. Units that feature the parameter selection switch will have varying messages when entering this mode. STPA, STPB, STPC, or STPD may be displayed in order to alert the user which parameter's setpoint is being viewed. Once the mode button is released, the display will read S (signifying setpoint mode), an up or down arrow (informing the user which direction the unit is counting), and a two digit number.

The two digit number is the preset number of screws in an assembly. This preset and the direction the unit counts is programmable in this state. If one or more of these parameters needs changed, the user may press the SET button. The entire display will begin flashing. If the SET button is held long enough, the display will stop flashing and only first digit of the preset will continue to flash. Using the UP or DOWN button the user can change the digit's value. Once the desired value is reached, pressing the SET button will accept that digit and the second digit in the preset will begin flashing. The second digit can be adjusted in the same manner as the first.

After adjusting the second digit and pressing the SET button, the direction arrow will begin flashing. Pressing the UP key will display an up arrow. Pressing the DOWN key will cause the unit to display a down arrow. Pressing the SET button will store the new value in memory.

At any point during the previously described process, the user may press the MODE button. Pressing the MODE button will allow the user to exit without saving a new preset.

If the unit contains a selector switch, changing the setpoint only effects the current parameter setting. Therefore, the user may create up to four different count scenarios.

Total Mode

Pressing the MODE button in setpoint mode will send the user to total mode. While the MODE button is still depressed TTLA will be displayed (if parameter A is selected). If the unit contains a parameter selection switch the message could vary as follows: TTLA, TTLB, TTLC or TTLD depending on the position of the switch.

After the MODE button is released, the display will show a number that represents the total number of units completed. For example, if the preset were four, it would take four screws to increment the total by one. Units that have a selector switch can keep track of four separate totals. Changing the selector switch at this point will allow the user to view all four of the totals.

When the total is incremented, a short double beep occurs. The user may choose to turn off this double beep function by changing a dip-switch setting.

The total may be reset to zero by pressing the SET button. The display will flash for approximately three seconds while the user holds the SET button. At the end of the three seconds, if the SET button is still held the total will then be reset to zero. Only the total being viewed will be cleared on unit's that have a parameter selector switch. Other totals will remain intact unless cleared in a similar fashion.

Any time the total changes, the value is stored in the units memory. Therefore, powering the unit down does not cause the unit to 'forget' the total.

Calibration Modes

The calibration modes are not intended to be accessed on a day to day basis. But an occasion may arise that the end user would need to have access to these modes. If a different tool is used or if the counter would stop counting properly, the calibration modes could help diagnose and correct problems.

To enter the calibration mode, the unit must be unlocked and in assembly mode if the user wishes to enter calibration mode. If the MODE button is pressed and held followed by the SET button being pressed, the display will show "CLBR" followed by "TOOL" when the buttons are released.

Timer X Setpoint

After the user released the buttons, the display will read TMXA until the MODE button is released (the display may read TMXA, TMXB, TMXC, or TMXD based on the parameter switch setting).

When the mode bottom is released, TX will be displayed along with a two digit number. The two digit number represents the amount of time the signal must be present for a legitimate count.

This number is adjustable from 00 to 99 (or 0.00 seconds to 0.99 seconds).

If TX is made to be zero no de-bounce value will be used. If TX is made to be to large, screws may be ignored.

Pressing the MODE button will allow the user to exit this mode. Pressing the SET button will allow the user to adjust this value.

If the unit contains a parameter switch, the switch setting will determine the parameter set for which TX is being adjusted.

Timer Y Setpoint

Upon entering the timer Y set up mode, the display will read TMYA (if the parameter switch is in the A position or the unit does not have a parameter switch).

Once the MODE button is released, TY, and a two digit number will be displayed. The two digit number represents the maximum time that the switch signal may be present. Signals that are greater than timer Y cause a reject to occur.

If TY is made to be to short good fasteners may be rejected.

Pressing the MODE button will allow the user to exit this mode. Pressing the SET button will allow the user to adjust this value.

Adjusting TY only effects the currently selected parameter.

View Total

The view total mode has two options, yes or no. If the user chooses yes, the unit will be allowed to toggle between assembly and total mode when locked. If the user chooses no, only the assembly mode will be visible when the unit is locked.

VTOT will be on the display until the display until the user releases the MODE button. Then "Y N" will be on the display.

To switch between yes and no states, the user must press the UP and DOWN buttons. Once the unit is in the desired state, pressing SET will save the VTOT information.

Once again, the VTOT state only applies to the current parameter setting on units that contain a parameter selection switch.

Counting Function

The counting function is independent of the current mode. This means that the user may perform adjustments and calibrations 'on the fly' without losing track of which assembly or screw has been completed. Pressing the 'SUSPEND' button will cause the unit to ignore counting during rework or calibrations.

Figure 3:
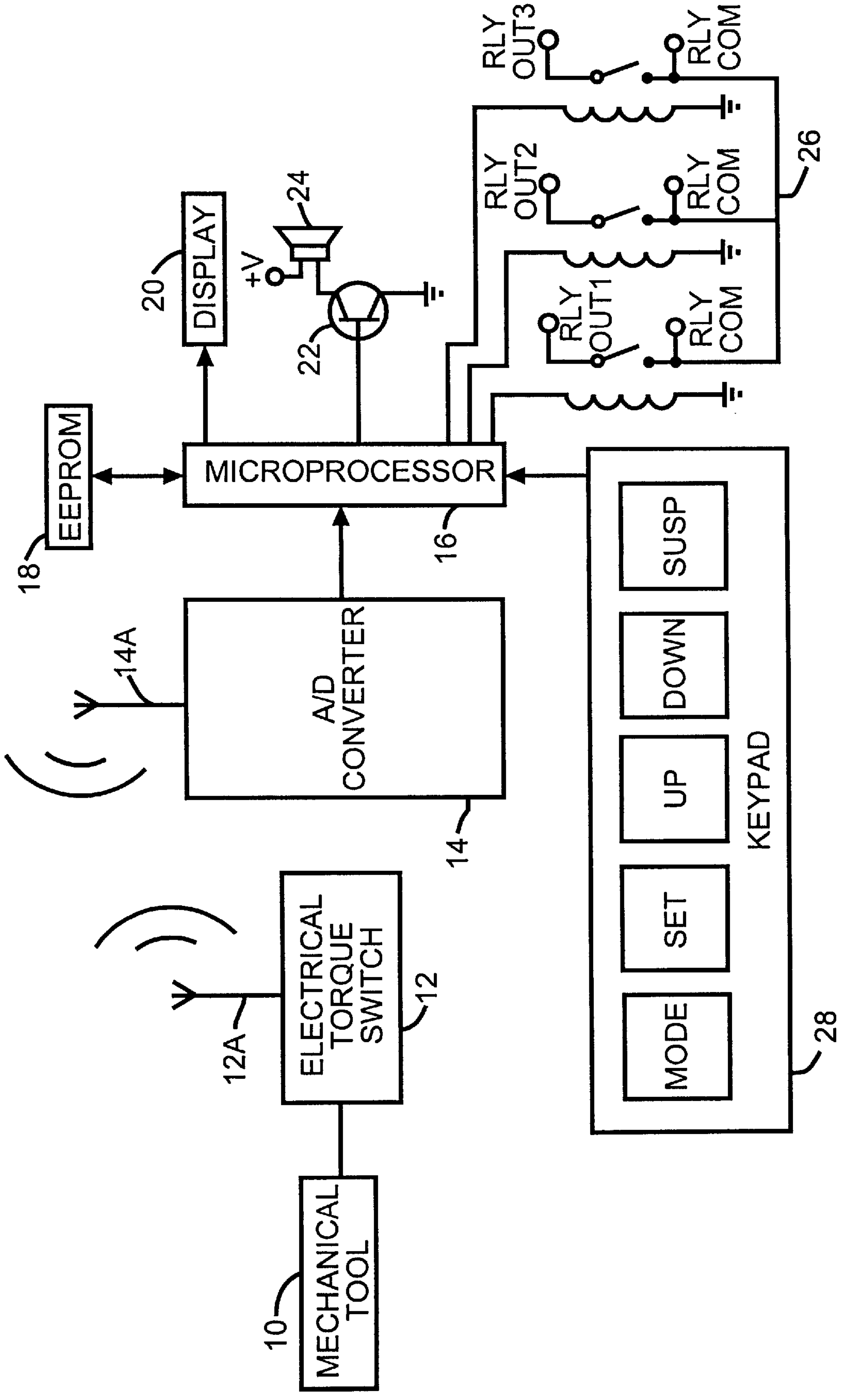
FIG. 3 is a block diagram for a monitoring system for an mechanical tool using a mechanical output format.

FIG. 3 shows mechanical tool 10. Torque switch 12 is an electrically stimulated switch that provides an electrical signal upon the mechanical wrench reaching target torque. Here AD converter 14 reads the closure of micro torque switch 12 and converts it into binary code. The AD converter reads the voltage of the torque switch, converts it into binary code for use by microprocessor 16 and EEPROM 18. EEPROM 18 memorizes tool count characteristics and tool settings for up to four tools. The voltage is an analog representation. RF antenna 12A transmits signals to RF receiver 14A.

Transistor 22 connects microprocessor 16 to alarm 24 which indicates bad tool cycles (incomplete) and completed tool cycles. Relays 26 are NO or NC momentary or latching relay outputs. Output 1 provides a signal on a bad cycle (incomplete). Output 2 provides a signal on a completed cycle and output 3 provides a signal on a batch completion. Key pad 28 gives instructions to the system through micro-pressor 16.

Figure 4:
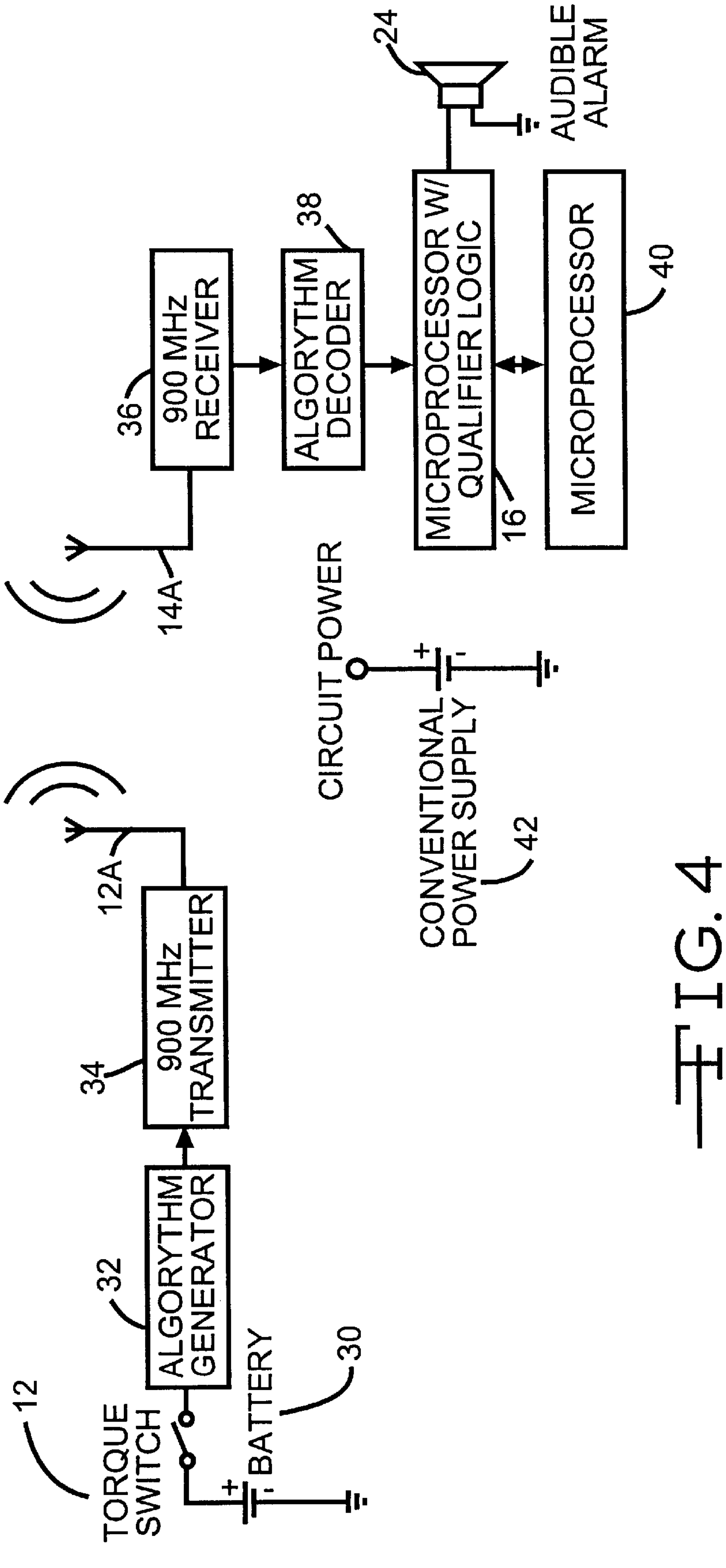
FIG. 4 is a schematic block diagram of the remote control system of this invention.

FIG. 4 shows torque switch 12 of FIG. 3 in greater detail. Switch 12 includes battery 30, algorithm generator 32,900 MHz transmitter 34 and RF antenna 12A. FIG. 4 also shows A/D converter 14 and microprocessor 16 in greater detail. Included are RF antenna 14A, 900 MHz receiver 36, algorithm decoder 38, microprocessor 16 and alarm 24. Also included are an additional microprocessor 40 and conventional power supply 42. Microprocessor 40 monitors the low battery function and may provide additional capacity to processor 16.

The transmitter module and receiver module operate according to the logic flow charts in the following Table.

Figure 5:
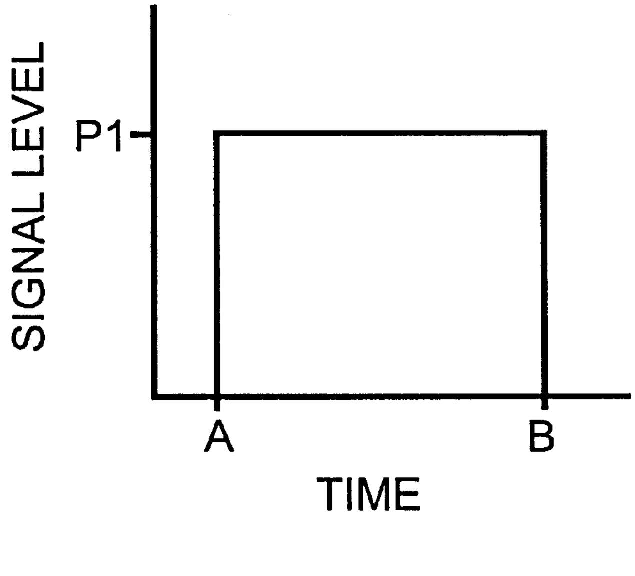
FIG. 5 is a graph of a typical signal level during tightening.

FIG. 5 shows typical signal levels during tightening. Signal level=analog signal at signal port; P1=signal while switch engaged; A=switch engaged; B=switch disengaged; Tx=minute time above Cal. window; and Ty=maximum time above Cal. window.

Figure 6:
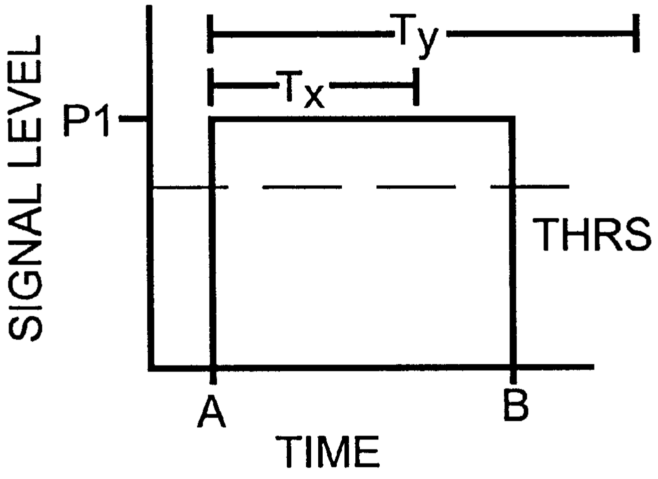
FIG. 6 is a graph of an approved tightening.

FIG. 6 shows approved tightening. Signal level rose to P1 and remained above the THRS calibrated window longer than Tx, but not longer than Ty. The accept signal is generated.

Figure 7:
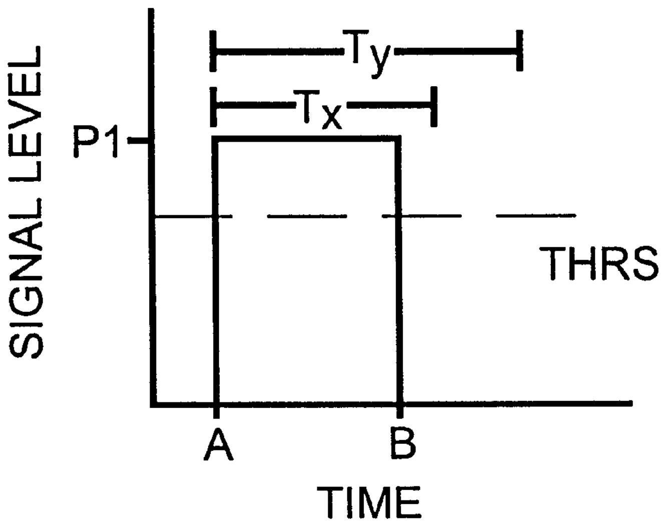
FIG. 7 is a graph of a not approved tightening.

FIG. 7 shows not approved tightening (under tightening). The signal rose above threshold level, but did not remain longer than timer Tx. A reject signal is generated. The programmed microprocessor is configured to ignore signals shorter than Tx. The signal would be "de-bounced" and ignored by the counter.

Figure 8:
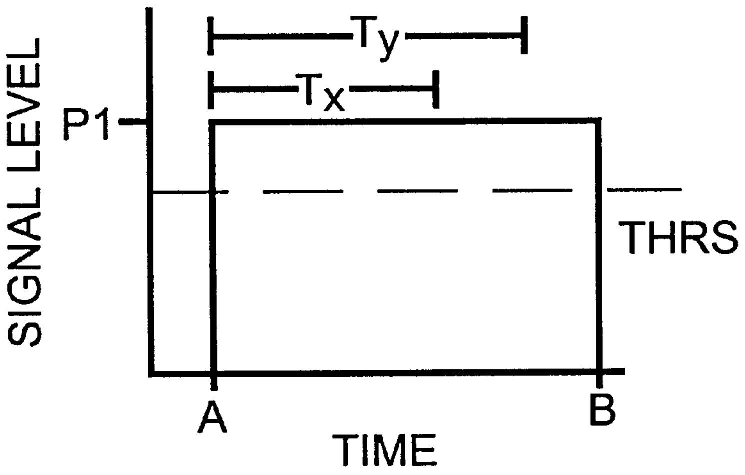
FIG. 8 is a graph of a not approved tightening (over tightening).

FIG. 8 shows not approved tightenings (over tightening). The signal level rose above threshold and remained longer than Ty. Since Ty was violated, a reject signal will be generated.

The transmitter has the ability to monitor the battery and transmit a "low battery" signal with the rolling code to indicate the qualifier that the tool's battery needs replaced. The qualifier then indicates to the user that the battery needs replaced.

Figure 9:
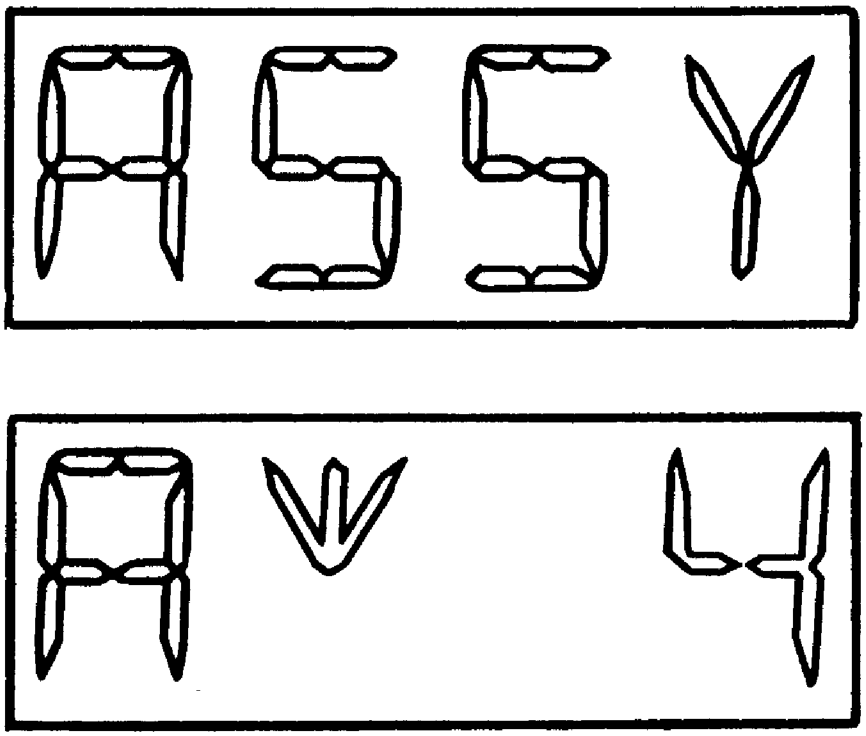
FIG. 9 is a representation of a typical display of the signal from a system according to this invention.

As previously discussed, FIG. 9 is a representation of a typical display of the signal from a system according to this invention.

The tools used with this invention are conventional and well known in the art. The labeled rectangular box of the Figures adequately represents them. The monitor of our invention is used with no modification to the tool. Measuring the parameters discussed provides the necessary input to the monitor/assembly qualifier we claim. The monitor of this invention does not control the tool. The key is to measure a parameter and use it to verify what the tool does. The monitor of this invention is a counting apparatus.

In addition to these embodiments, persons skilled in the art can see that numerous modifications and changes may be made to the above invention without departing from the intended spirit and scope thereof.

TABLE

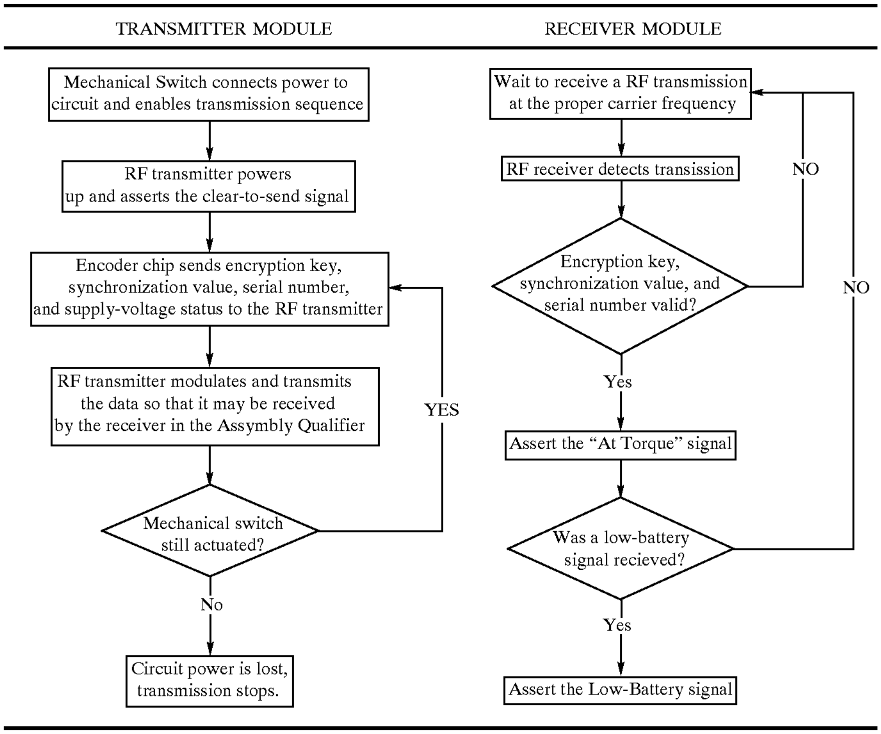

We claim:

1. A system for monitoring a mechanical tool with a mechanical switch comprising:

the mechanical tool including a means for stimulating the switch wherein the switch can provide electrical signals upon reaching a mechanical parameter;

the mechanical tool also including a transmitter for sending the electrical signals to a receiver;

a remote qualifier including a receiver for receiving the electrical signals from the transmitter of the mechanical tool;

the remote qualifier also including a means for electrically computationally processing the electrical signals into other signals representing at least one parameter corresponding to a condition of the mechanical tool being monitored which is a function of the condition, wherein the means for electrically processing the signals includes a programmed microprocessor configured to identify a portion of the signals representative of the mechanical switch condition corresponding to the parameter and wherein the programmed microprocessor is configured to identify and store the parameter of a first period of time for the electrical signal to attain a predetermined level and also configured to identify and store a second period of time for the electrical signal to remain at that level; and a means for displaying the parameter.

2. A system for monitoring a mechanical torque wrench with a torque switch comprising:

the torque wrench including a means for stimulating the torque switch wherein the switch can provide an electrical signal upon reaching target torque;

the torque wrench also including a transmitter for sending the electrical signals to a receiver;

a remote qualifier including a receiver for receiving the electrical signals from the transmitter of the torque wrench;

the remote qualifier also including a means for electrically computationally processing the electrical signals into other signals representing at least one parameter corresponding to a condition of the mechanical tool being monitored which is a function of the condition, wherein the means for electrically processing the signals includes a programmed microprocessor configured to identify a portion of the signals representative of the mechanical switch condition corresponding to the parameter and wherein the programmed microprocessor is configured to identify and store the parameter of a first period of time for the electrical signal to attain a predetermined level and also configured to identify and store a second period of time for the electrical signal to remain at that level; and a means for displaying the parameter.

3. A system according to claim 2 wherein the transmitter is a radio frequency transmitter and the receiver is a radio frequency receiver.

4. A system for monitoring a mechanical torque wrench with a torque switch comprising:

the torque wrench including a means for stimulating the torque switch wherein the switch can provide an electrical signal upon reaching target torque;

the torque wrench also including a transmitter for sending the electrical signals to a receiver wherein the transmitter is a radio frequency transmitter and the receiver is a radio frequency receiver and wherein the transmitter and receiver include a rolling code algorithm to ensure that receivers and transmitters that are on the same frequency do not "cross talk";

a remote qualifier including a receiver for receiving the electrical signals from the transmitter of the torque wrench;

the remote qualifier also including a means for electrically computationally processing the electrical signals into other signals representing at least one parameter corresponding to a condition of the mechanical tool being monitored which is a function of the condition, wherein the means for electrically processing the signals includes a programmed microprocessor configured to identify a portion of the signals representative of the mechanical switch condition corresponding to the parameter; and a means for displaying the parameter.

5. A system for monitoring a mechanical torque wrench with a torque switch comprising:

the torque wrench including a means for stimulating the torque switch wherein the switch can provide an electrical signal upon reaching target torque;

the torque wrench also including a transmitter for sending the electrical signals to a receiver wherein the transmitter is a radio frequency transmitter and the receiver is a radio frequency receiver wherein the transmitter has a seed code and the qualifier is configured to learn the seed code of the transmitter;

a remote qualifier including a receiver for receiving the electrical signals from the transmitter of the torque wrench;

the remote qualifier also including a means for electrically computationally processing the electrical signals into other signals representing at least one parameter corresponding to a condition of the mechanical tool being monitored which is a function of the condition, wherein the means for electrically processing the signal includes a programmed microprocessor configured to identify a portion of the signals representative of the mechanical switch condition corresponding to the parameter; and a means for displaying the parameter.

6. A system according to claim 2 wherein the programmed microprocessor is configured to identify and store a portion of the electrical signal as a calibration value.

7. A system according to claim 3 wherein the programmed microprocessor is configured to identify and store the parameter of a threshold corresponding to the calibration value.

8. A system according to claim 2 wherein the programmed microprocessor is configured to identify a portion of the signals representative of the electrical signal of the wrench driving a fastener to its target torque and successfully completing a cycle.

9. A system according to claim 2 wherein the programmed microprocessor is configured to count a completed cycle, store the count and generate signals when the measured current is the same as the identified and stored parameter.

10. A system according to claim 2 wherein the programmed microprocessor is configured to generate signals when a cycle is completed unsuccessfully.

11. A system according to claim 2 wherein the programmed microprocessor is configured to generate signals when a fastener has been over tightened.

12. A system according to claim 2 wherein the programmed microprocessor is configured to ignore signals that do not meet the identified and stored parameter.

13. A system according to claim 2 wherein a battery provides power to the transmitter.

14. A system according to claim 13 wherein the transmitter includes a means to monitor the power of the battery and the means to transmit a low battery signal to the receiver.

15. A system according to claim 2 wherein the programmed microprocessor is configured to count a completed cycle when the measured torque is the same as the identified and stored parameter, wherein the programmed microprocessor is configured to identify a portion of the signal representative of the torque of the wrench driving a fastener to its target torque and successfully completing a cycle, and wherein the programmed microprocessor is configured to count a completed cycle, store the count and generate signals when the measured torque is the same as the identified and stored parameter.

16. A process for monitoring a mechanical tool with a mechanical switch comprising the steps of:

stimulating the switch to provide electrical signals upon the mechanical tool reaching a mechanical parameter;

transmitting the electrical signals from a transmitter connected to the mechanical switch of the mechanical tool;

receiving the electrical signals from the transmitter with a receiver connected to a qualifier;

transmitting the electrical signals from the receiver to a programmed microprocessor connected to the qualifier;

configuring the microprocessor to identify and store the parameter of a first period of time for the electrical signal to attain a predetermined level and also configuring the microprocessor to identify and store a second period of time for the electrical signal to remain at that level;

identifying the electrical signals from the receiver and comparing them to a stored parameter;

counting a completed cycle when the identified signals are the same as the stored parameter; and displaying the counted parameter on a display connected to the qualifier.

17. A process according to claim 16 including the step of converting the electrical signals into binary code before transmitting the signals to the receiver.

18. A process according to claim 16 wherein the mechanical tool and the mechanical switch are a mechanical torque wrench and torque switch and the transmitted electrical signals represent the torque of the wrench.

19. A process according to claim 16 wherein the transmitter and receiver are radio frequency modules and the transmitted signals are radio frequency signals.

20. A process according to claim 18 wherein the programmed microprocessor counts a completed cycle when the measured torque is the same as the identified and stored parameter, wherein the programmed microprocessor identifies a portion of the signal representative of the torque of the wrench driving a fastener to its target torque and successfully completing a cycle, and wherein the programmed microprocessor counts a completed cycle, store the count and generate signals when the measured torque is the same as the identified and stored parameter.

21. A process according to claim 16 wherein the programmed microprocessor generate signals when a cycle is completed unsuccessfully.

22. A process according to claim 20 wherein the programmed microprocessor generate signals when a fastener has been over tightened.

23. A process for monitoring a mechanical tool with a mechanical switch comprising the steps of:

stimulating the switch to provide electrical signals upon the mechanical tool reaching a mechanical parameter;

transmitting the electrical signals from a radio frequency transmitter connected to the mechanical switch of the mechanical tool;

receiving the electrical signals from the transmitter with a radio frequency receiver connected to a qualifier;

including a rolling code algorithm in the transmitter and receiver to ensure that receivers and transmitters that are on the same frequency do not "cross talk";

transmitting the electrical signals from the receiver to a programmed microprocessor connected to the qualifier;

identifying the electrical signals from the receiver and comparing them to a stored parameter;

counting a completed cycle when the identified signals are the same as the stored parameter; and displaying the counted parameter on a display connected to the qualifier.

24. A process for monitoring a mechanical tool with a mechanical switch comprising the steps of:

stimulating the switch to provide electrical signals upon the mechanical tool reaching a mechanical parameter;

transmitting the electrical signals from a radio frequency transmitter connected to the mechanical switch of the mechanical tool;

receiving the electrical signals from the transmitter with a radio frequency receiver connected to a qualifier;

including a seed code in the transmitter; and configuring the qualifier to learn the seed code of the transmitter;

transmitting the electrical signals from the receiver to a programmed microprocessor connected to the qualifier;

identifying the electrical signals from the receiver and comparing them to a store parameter;

counting a completed cycle when the identified signals are the same as the stored parameter; and displaying the counted parameter on a display connected to the qualifier.

* * * * *